US008810227B2

(12) United States Patent
Flaibani et al.

(10) Patent No.: US 8,810,227 B2
(45) Date of Patent: Aug. 19, 2014

(54) SYSTEM AND METHOD FOR CONTROLLING A SWITCHED-MODE POWER SUPPLY

(75) Inventors: Marco Flaibani, Padua (IT); Cristian Garbossa, Bressanone (IT); Enrico Orietti, Pozzonovo (IT); Andrea Vecchiato, Mirano (IT)

(73) Assignee: Infineon Technologies Austria AG, Villach (AT)

( * ) Notice: Subject to any disclaimer, the term of this patent is extended or adjusted under 35 U.S.C. 154(b) by 477 days.

(21) Appl. No.: 13/007,276

(22) Filed: Jan. 14, 2011

(65) Prior Publication Data

US 2012/0182003 A1    Jul. 19, 2012

(51) Int. Cl.
*H02M 3/156*    (2006.01)

(52) U.S. Cl.
USPC ........................................................ 323/285

(58) Field of Classification Search
USPC .................................. 323/282, 284, 285, 288
See application file for complete search history.

(56) References Cited

U.S. PATENT DOCUMENTS

| 5,568,044 A | 10/1996 | Bittner |
| 6,198,258 B1 | 3/2001 | Ando et al. |
| 6,208,216 B1 | 3/2001 | Nasila |
| 6,307,356 B1 | 10/2001 | Dwelley |
| 6,366,070 B1 | 4/2002 | Cooke et al. |
| 7,268,526 B1 | 9/2007 | Smith |
| 7,446,621 B2 | 11/2008 | Chen et al. |
| 7,782,036 B1 | 8/2010 | Wong et al. |
| 2003/0214276 A1 | 11/2003 | Bernardon |
| 2009/0206814 A1* | 8/2009 | Zhang et al. .................. 323/284 |

FOREIGN PATENT DOCUMENTS

DE        60029800        2/2007

* cited by examiner

*Primary Examiner* — Harry Behm
*Assistant Examiner* — Matthew Grubb
(74) *Attorney, Agent, or Firm* — Slater & Matsil, L.L.P.

(57) ABSTRACT

In an embodiment, a method of operating a switched-mode power supply includes producing an error signal based on a difference between a power supply output voltage and a reference voltage. A clock frequency is produced that is proportional to the error signal up to maximum frequency, and a sensed current signal is produced that is proportional to a current in switched-mode power supply. The error signal is summed with the sensed current signal to produce a first signal, and the first signal is compared to a first threshold. The method also includes producing a first edge of a drive signal at a first edge of the clock signal, and producing a second edge of the drive signal when the first signal crosses the first threshold in a first direction based on the comparing, where the second edge opposite the first edge.

20 Claims, 8 Drawing Sheets

SYSTEM AND METHOD FOR CONTROLLING A SWITCHED-MODE POWER SUPPLY

TECHNICAL FIELD

This invention relates generally to semiconductor devices and methods, and more particularly to a system and method for controlling a switched-mode power supply.

BACKGROUND

In recent years, stringent requirements concerning the efficiency of power supplies have brought attention to the use of switched mode power supplies (SMPS). However, the actual efficiency of a SMPS depends on the controller that determines the switching instants of the one or more switches included in the SMPS. One approach for controlling the switching of an SMPS is using pulse width modulation (PWM), which can be implemented quite easily. However, using PWM for controlling a SMPS to regulate its output voltage or output current does not necessarily guarantee a high efficiency over a wide range of output currents.

A PWM based controller unit operates at a fixed frequency (PWM frequency). The duty-cycle of a rectangular PWM signal is modulated in order to regulate the power-supply output voltage or current. In some cases, the efficiency of a power converter decreases at low output currents as driving losses remain constant. These driving losses are related to the power consumed by switching on and off the one or more semiconductor switches used in the output stage of the switching converter. In order to decrease the contribution of driving losses to the total amount of losses, pulse frequency modulation (PFM) may be used for controlling the one or more semiconductor switches included in the output stage of the switching converter.

A controller unit using PFM reduces the duty cycle by reducing the switching frequency while keeping a constant on-time, instead of reducing the on-time at constant frequency, as it is done with PWM control. The efficiency of PFM control, however, becomes increasingly as the switching frequency and output current increases, thereby causing a corresponding increase in switching losses and driving losses.

SUMMARY OF THE INVENTION

In an embodiment, a method of operating a switched-mode power supply includes producing an error signal based on a difference between a power supply output voltage and a reference voltage. A clock frequency is produced that is proportional to the error signal up to maximum frequency, and a sensed current signal is produced that is proportional to a current in switched-mode power supply. The error signal is summed with the sensed current signal to produce a first signal, and the first signal is compared to a first threshold. The method also includes producing a first edge of a drive signal at a first edge of the clock signal, and producing a second edge of the drive signal when the first signal crosses the first threshold in a first direction based on the comparing, where the second edge opposite the first edge.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for controlling a switched-mode power supply.

In an embodiment, a switched mode power supply controller smoothly transitions from PFM operation at lower power supply output currents to PWM operation at higher power supply output currents. In one embodiment, a voltage controlled oscillator (VCO) coupled to the output of an error amplifier generates a clock signal from which the switch control signal is derived. In an embodiment, the voltage to frequency transfer function is linear up until the VCO reaches a maximum frequency or until a designated error voltage is detected, at which point the VCO operates at maximum frequency. During operation, a PWM system modulates the duty cycle of the switch signal while the system is operating at the maximum frequency of the VCO. When the VCO is operating below its maximum frequency, the same PWM modulation system generates a PFM signal for the switch driver.

In some embodiments, some parts of the power supply system are shut down in order to reduce overall current consumption. For example, some portions of the power supply circuit besides the error amplifier and VCO can be shut down between PFM output pulses in some embodiments.

Figure 1A:
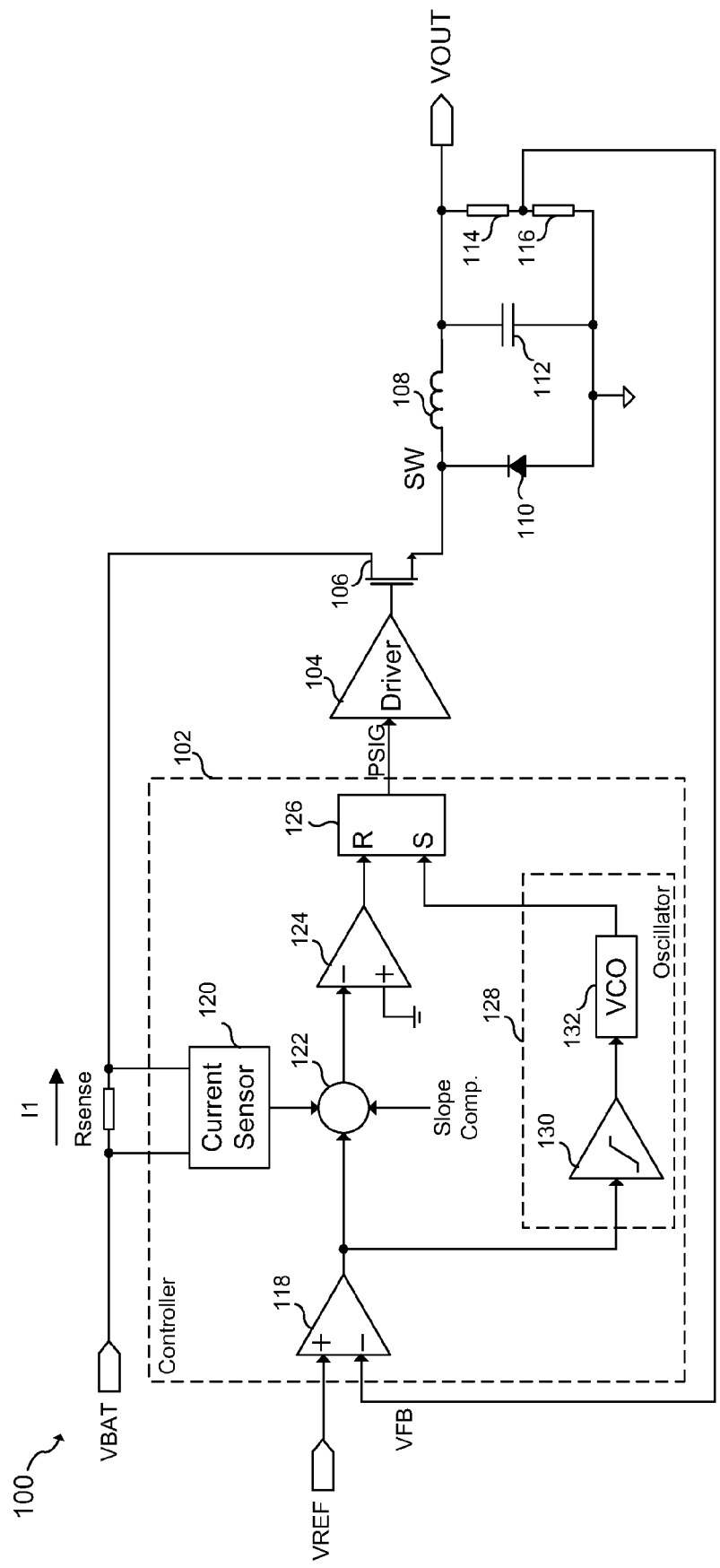
FIGS. 1a-1b illustrate block diagrams of embodiment power supply systems.

FIG. 1a illustrates embodiment power supply system 100 that produces a regulated voltage VOUT from input voltage VBAT. In one embodiment, VBAT is between 10V and 15V, and VOUT is regulated to about 5V. In other embodiments, other input voltages and regulated voltages can be used. In the illustrated embodiment, power supply system 100 is configured as a buck converter that includes semiconductor switch 106 coupled to diode 110 and inductor 108 at node SW. During operation, controller 102 generates pulse-width modulated (PWM) or pulse frequency modulated (PFM) signal PSIG that drives semiconductor switch 106 via driver 104, thereby coupling and decoupling battery voltage VBAT to node SW. When semiconductor switch 106 is ON, current flows from terminal VBAT though inductor 108 to charge capacitor 112. When switch 106 is off, current continues to flow through the inductor 108 via diode 110. In embodiments in which the power supply operates in a discontinuous conduction mode (DCM), capacitor 112 discharges via resistors 114 and 116 and via a coupled load after energy stored in inductor 108 has dissipated. In an embodiment, inductor 108 has a value of between about 2 μH and about 100 μH, switch 106 is capable of conducting between about 1 A to about 4 A, capacitor 112 has a capacitance between about 10 μF and about 1 mF, and the power supply operates at a switching frequency of between about 100 KHz to about 3 MHz. In alternative embodiments, different ranges for inductance, current rating, capacitance and switching frequency can be used, including values outside of the ranges stated.

It should be appreciated that the buck converter illustrated in FIG. 1*a* is just one example of a power supply topology using embodiment concepts. Further embodiments of the present invention can be applied to converters including, but not limited to, boost converters, buck-boost, single-ended primary-inductor converter (SEPIC), and Cuk converters. In such embodiments, external components are placed according to the particular topology. Alternative embodiment power supply topologies can also include power supplies using transformers instead of inductors, or topologies using both inductors and transformers.

In an embodiment, output node OUT is coupled to feedback input VFB of controller 102 via a resistor divider made of resistors 114 and 116. Controller 102 adjusts the duty cycle of signal DR, driving switch 106 according to the voltage detected at node OUT, and according to a current sensed across resistor Rsense such that the voltage at node VOUT is regulated to a predetermined voltage. In some embodiments, the predetermined voltage is set by the voltage at VREF.

In an embodiment, controller 102 produces pulse modulated signal PSIG based on a difference between reference voltage VREF and feedback voltage VFB, as measured by error amplifier 118, and based on current I1 as measured by current sensor 120. The outputs of current sensor 120 and error amplifier 118 are summed by summing block 122, the output of which is coupled to comparator 124. The output of comparator 124 is coupled to the reset input of latch 126. It should be appreciated that the blocks depicted in controller 102 are functional in nature and can be implemented in a variety of ways. For example, error amplifier 118 and current sensor 120 can be implemented using transconductance amplifiers, and summing block 122 can be implemented using one or more current summing nodes. In some embodiments, a slope compensation signal is also summed by summing block 122.

In an embodiment, the output of error amplifier is further coupled to the input of oscillator 128, the output of which is coupled to the set input of latch 126. In one embodiment, the frequency of oscillator 128 is linearly related to the output of error amplifier 118 over a certain range of inputs, above which the frequency is limited to a maximum frequency. The diagram of FIG. 1*a* represents this characteristic functionally on a system level by showing limiter 130 in series with VCO 132. It should be understood that oscillator 128 can be implemented in a variety of ways to achieve the voltage-frequency characteristic represented by block 128. In some embodiments, the voltage-frequency characteristic exhibits a hard-limiting characteristic. Alternatively, a soft limiting characteristic and/or a non-linear voltage-frequency transfer characteristic can be used.

Driver 104 is coupled to the output of latch 126 and drives a switch represented by NMOS transistor 106. In some embodiments, the switch and driver are implemented using structures and techniques known in the art. In alternative embodiments of the present invention, switch 106 can be implemented by a PMOS device, BJT device, JFET device, IGBT device, or by other device types, depending on the particular application and its specifications.

In one embodiment, controller 102 resides on a single integrated circuit. In further embodiments, driver 104, switch transistor 106, diode 110 and/or inductor 108 can also be included on the same integrated circuit. In an embodiment, the output voltage is set by the ratio of resistors 114 and 116 and/or the output current is set via external components such as inductor 108, capacitor 112, and the size of transistor 106, and the resistance value of sense resistor Rsense. In an embodiment, resistor Rsense senses a current from a battery input node to an input of a semiconductor switch. In alternative embodiments, Rsense can be positioned in other places within the power supply system, for example, in series with inductance 108 or in series with the diode 110.

Figure 1B:
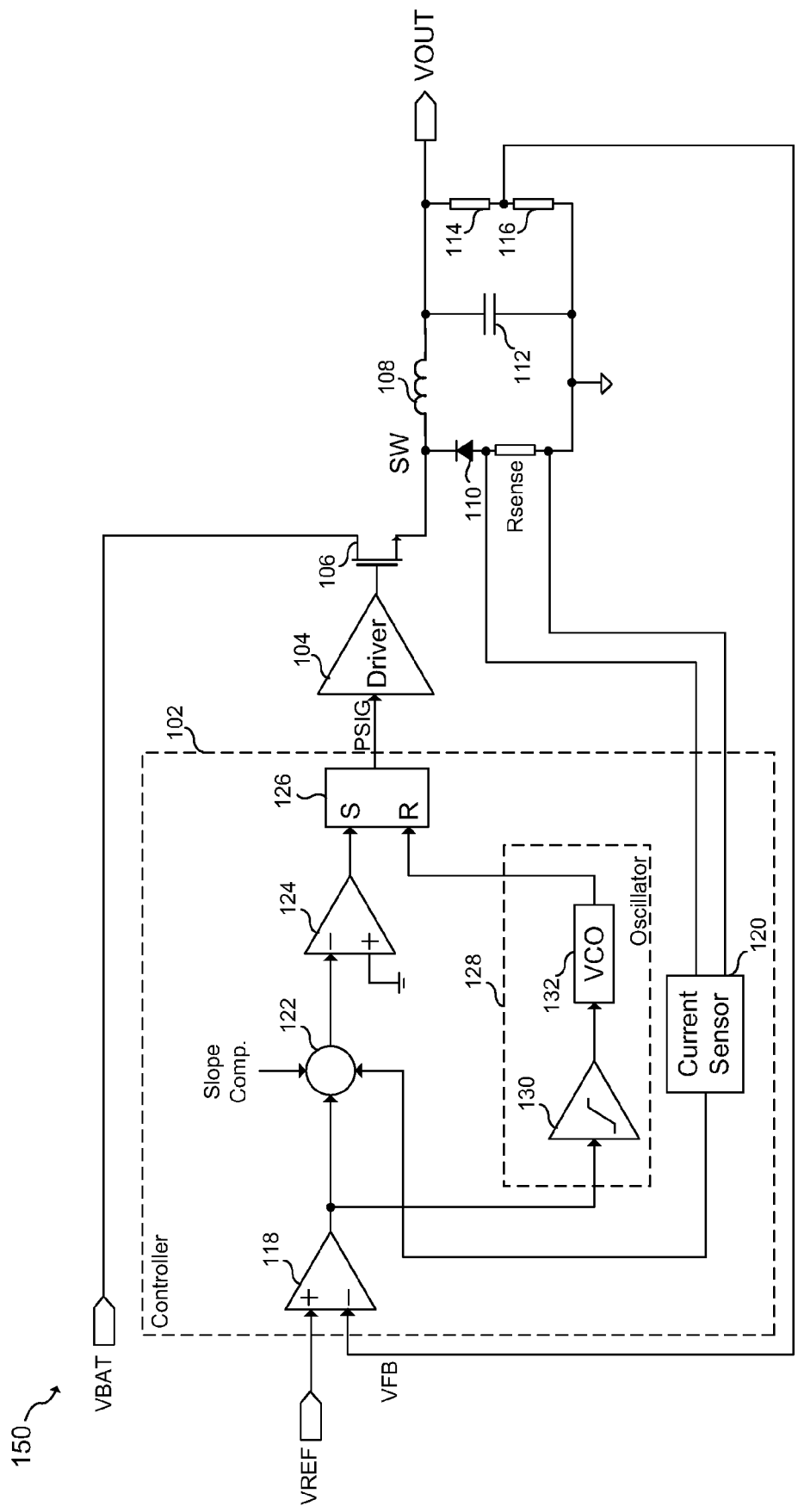

FIG. 1*b* illustrates embodiment system 150 in which Rsense is coupled between ground and the anode of diode 110. In one embodiment, the set and reset inputs of latch 126 are reversed with respect to the embodiment of FIG. 1*a*, hence, the set input of latch 126 is coupled to the output of comparator 124, and the reset input of latch 126 is coupled to the output of oscillator 128. In such an embodiment, system 150 operates in a valley current mode. Alternatively, Rsense can also be placed in series with the cathode of diode 110.

Figure 2:
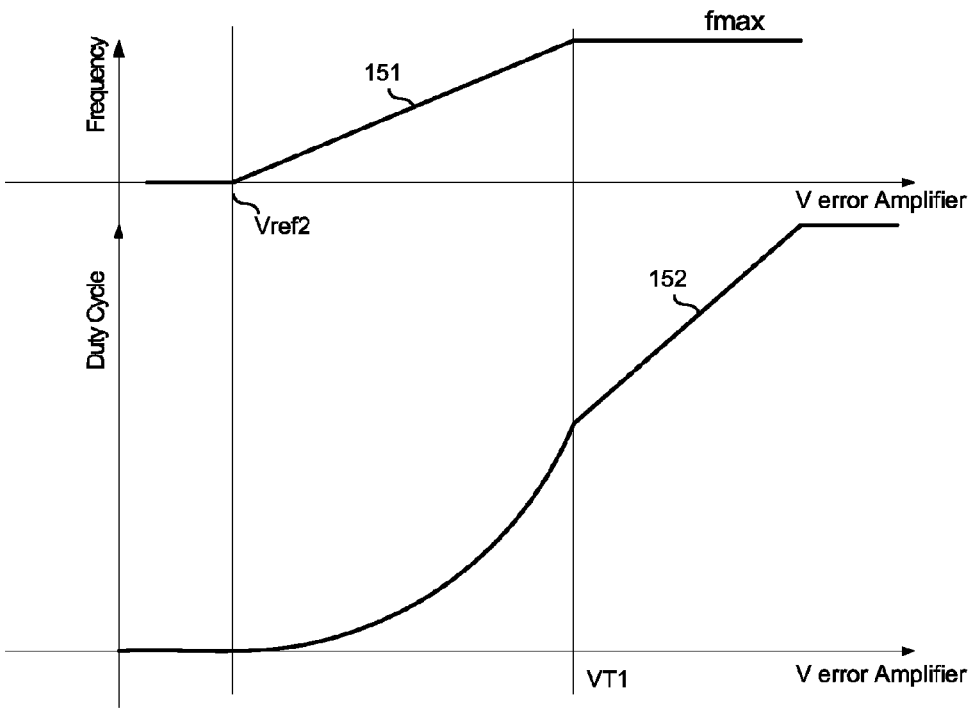
FIG. 2 illustrates a transfer functions of an embodiment power supply system.

FIG. 2 illustrates a waveform diagram showing transfer characteristics of the system of FIG. 1 with respect to a negative version of the error voltage seen at the output of error amplifier 118. Trace 151 represents the output frequency of the pulse width modulated signal driving switch 106 (FIG. 1*a*). In an embodiment, when the feedback node is less than or equal to internal reference voltage Vref2 within oscillator 128, output frequency 151 is very low. This represents a case of a small error or an overvoltage. In some embodiments, the output frequency of the oscillator is zero when the feedback voltage is less than or equal to Vref2. When the error voltage is between Vref2 and threshold voltage VT1, frequency 150 is proportional to the error voltage. In some embodiments, the voltage-frequency characteristic of the VCO is linear, while in other embodiments, the voltage-frequency characteristic can be non-linear. For error voltages greater than VT1, the output frequency is fmax.

Trace 152 represents a duty cycle of the signal driving switch 106 (FIG. 1*a*). In an embodiment, the duty cycle is a minimum value for error voltages less than Vref2. Alternatively, the duty cycle is zero in this region. In embodiments where the VCO has a linear voltage-frequency characteristic for inputs between Vref2 and VT1 and a fixed on duration, the slope of the duty cycle vs. error voltage is hyperbolic (Ton/freq). In alternative embodiments, where the VCO does not have a linear voltage-frequency characteristic, the duty cycle vs. error voltage characteristics may be different. For error voltage inputs greater than VT1, corresponding to a region where the frequency of the oscillator is constant, the duty cycle vs. error voltage varies linearly up to a maximum duty cycle of 100%. Alternatively, a smaller maximum duty cycle can be used. In some embodiments, both the frequency and pulse duration can be modulated, and the duty cycle vs. error voltage characteristics may differ from the characteristic of curve 152. In further embodiments, both the frequency and pulse duration are modulated in such a way that yields a monotonic duty cycle vs. error voltage characteristic to prevent instability and limit cycles with respect to variations in pulse duration and frequency. In some embodiments, a single pulse duration is defined such that boundary conditions (Vin, Vout, inductance value etc.) are fixed for a given frequency.

Figure 3:
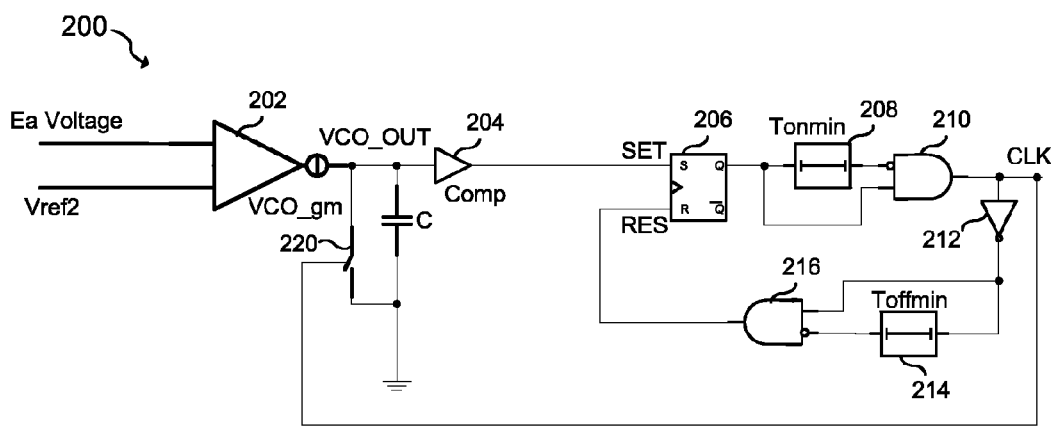
FIG. 3 illustrates a schematic of an embodiment voltage controlled oscillator (VCO)

FIG. 3 illustrates a schematic of embodiment oscillator 200. In an embodiment, transconductance amplifier 202 charges capacitor C with a current proportional to a voltage difference between Ea Voltage and Vref. If signal EA Voltage is below reference voltage Vref2, the voltage at node VCO_OUT stays low or is discharged by transconductance amplifier 202. On the other hand, when Ea Voltage is above Vref, transconductance amplifier 202 charges capacitor C, thereby causing a voltage increase at node VCO_OUT. When the voltage at node VCO_OUT crosses the threshold of comparator 204 and latch 206 is set. Signal CLK then goes high for a time duration of about Tonmin, then and stays low for a minimum time duration of Tonmin. The durations of Tonmin and Tonmin are set using delay elements 208 and 214, which are implemented using techniques known in the art. In an embodiment, Tonmin is between about 50 ns and 500 ns, and Toffmin is between about 50 ns and 500 ns. Alternatively, other time ranges can be used. Furthermore, when signal CLK goes high, capacitor C is discharged via switch 220, and node VCO_OUT is reset to ground, thereby starting a new charging phase. In an embodiment, switch 220 can be implemented using, for example, a NMOS or PMOS switch, or a switch implement by another device type. In an embodiment, SR latch 206 provides a reset dominant path, which effectively limits the maximum switching frequency of oscillator 200 to about 1/(Tonmin+Toffmin). In an alternative embodiment, switch 220 can be coupled to VDD, such that capacitor C is discharged by transconductance amplifier 202. In one such embodiment, the polarity of amplifier 202 is reversed to accommodate switch 220 being coupled to VDD.

In an embodiment, oscillator 200 includes delay elements 208 and 214, and logic gates 210, 212 and 216 and SR latch 206. In alternative embodiments, other logic structures, gate types and logic types can be used to implement the illustrated logical function. In further embodiments, the maximum frequency of oscillator 200 can be limited using other techniques, such as setting the maximum frequency using external components such as resistors. For example, in one embodiment in which the controller resides on an integrated circuit, the frequency of the oscillator is set by coupling a resistor between an external pin and ground. Using an amplifier, a voltage equal to a fraction of a bandgap voltage is imposed on the resistor, and a current across the resistor is mirrored to a capacitor where a sawtooth wave is generated to charge and discharge a capacitor. In one embodiment, the mirrored current is used to set a bias current in amplifier 202 such that the maximum output current available to charge capacitor C sets the maximum frequency of the oscillator.

Figure 4:
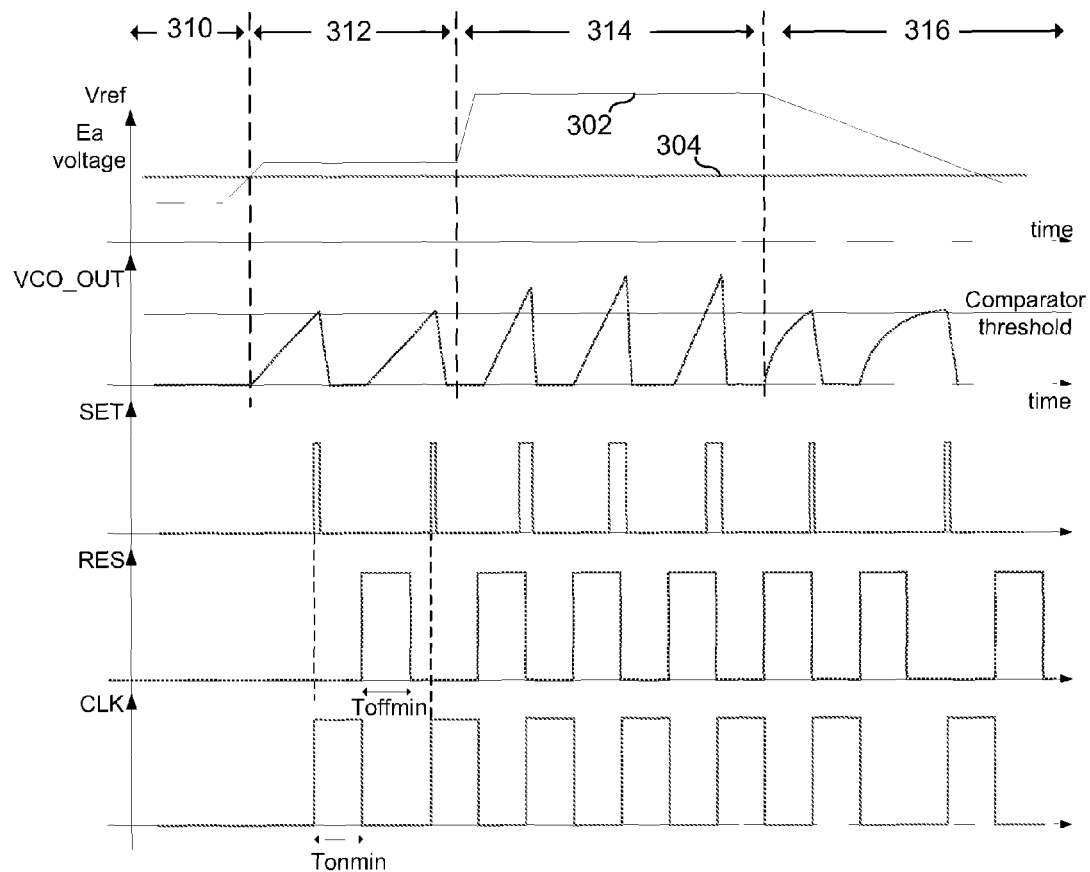
FIG. 4 illustrates a waveform diagram showing the operation of an embodiment power supply controller.

FIG. 4 illustrates a waveform diagram showing the operation of oscillator 200 (FIG. 3.) In region 310, where Ea Voltage 302 is less than Vref 304, node VCO_OUT stays low, and the oscillator frequency is zero. In region 312, where Ea Voltage is slightly above Vref, the oscillator operates at less then its maximum frequency. As shown, set input of latch 206 goes high when node VCO_OUT reaches the comparator threshold, thereby causing CLK to go high for a duration of Tonmin, after which the reset input latch 206 is high for a period of Toffmin. In region 314, Ea Voltage is greater than Vref such that the oscillator operates at its maximum frequency. In region 316, the frequency of the oscillator decreases as Ea Voltage decreases.

Figure 5A:
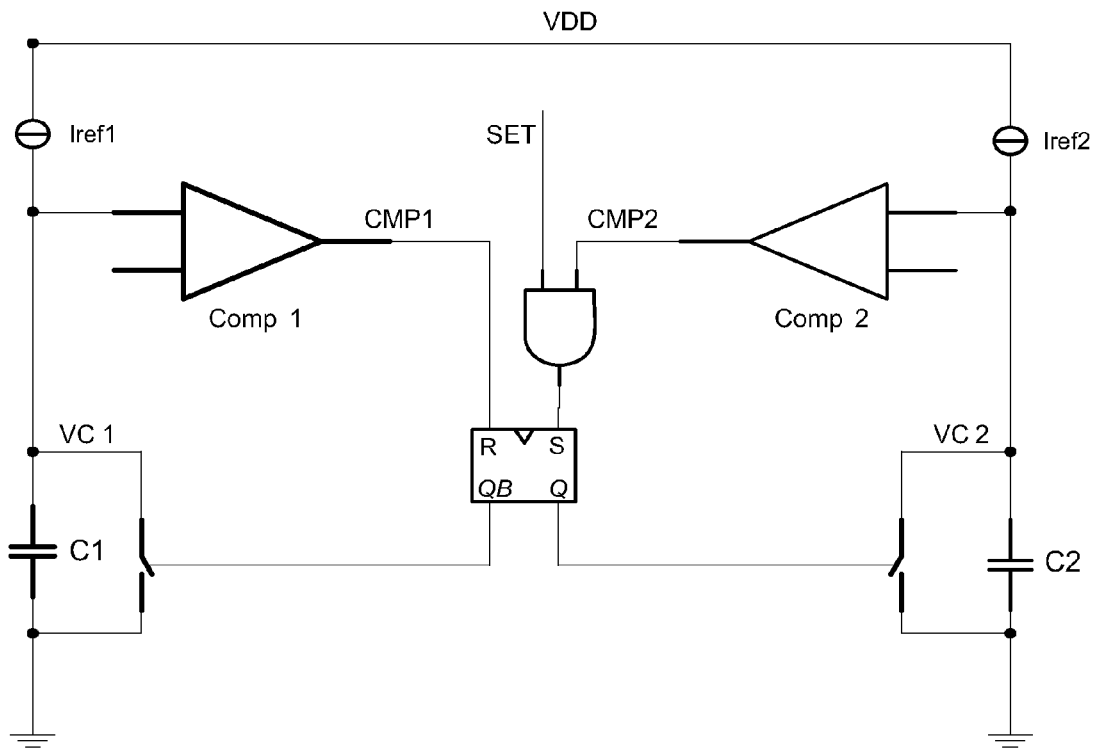
FIGS. 5a-b illustrate a dual relaxation oscillator according to an alternative embodiment and a corresponding timing diagram.

FIG. 5a illustrates an alternative embodiment in which the function of latch 206, delays 208 and 214, and gates 210, 212 and 216 shown in FIG. 3 is implemented by a dual relaxation oscillator. Here, node VC1 charges while node VC2 is reset, and node VC2 charges while node VC2 is reset. In an embodiment, signal Q represents output clock signal CLK shown in FIG. 3. In an embodiment, parameter Tonmin is set by current Iref1 and capacitance C1, and parameter Toffmin is set by current Iref2 and capacitance C2. In alternative embodiments, other dual relaxation oscillators topologies can be used.

Figure 5B:
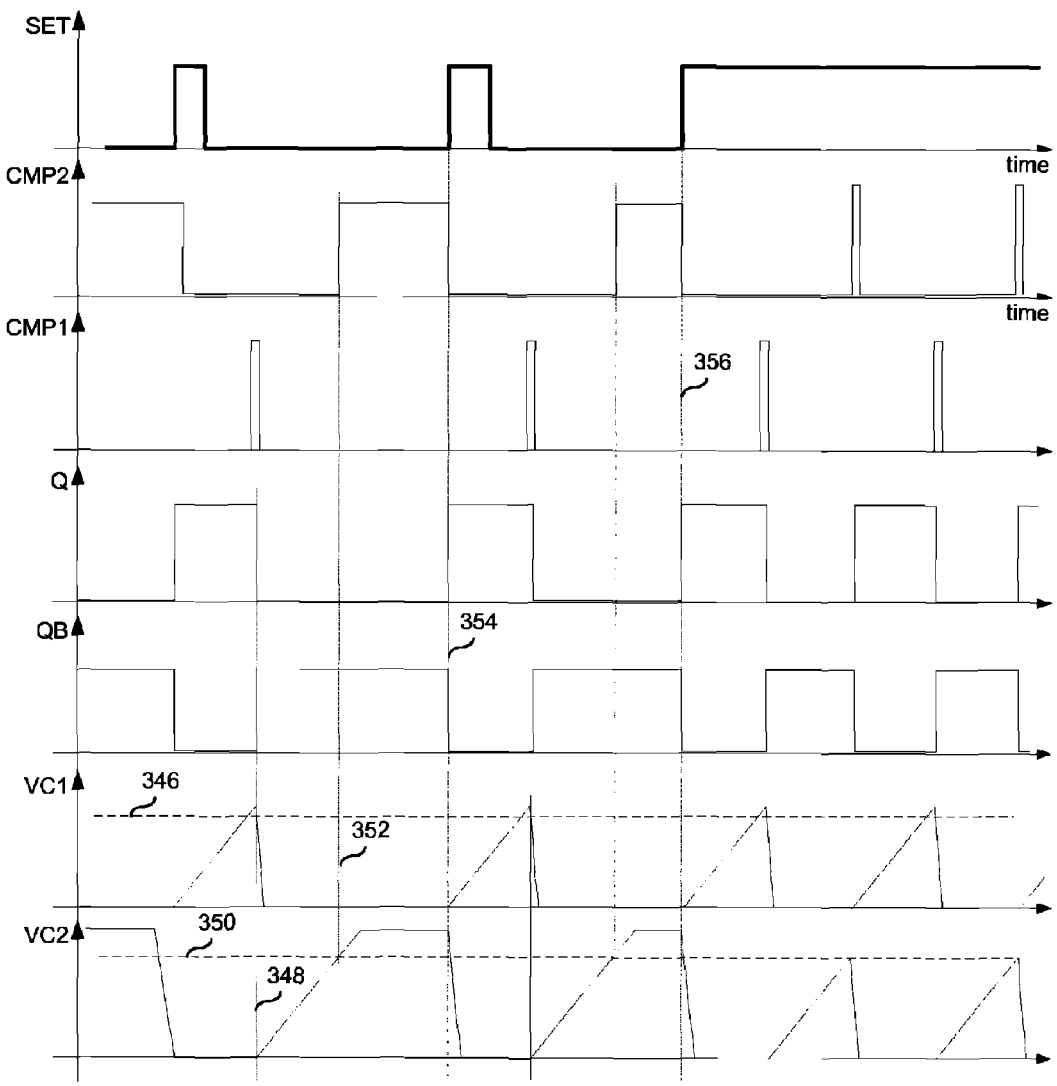

FIG. 5b illustrates a timing diagram of the embodiment dual relaxation oscillator of FIG. 5b. When SET goes high, node VC1 charges until first comparator threshold 346 is reached, at which point, node VC1 is discharged to ground, Q goes low, and the voltage at node VC2 begins to increase. When the voltage at VC2 exceeds comparator threshold 350, the voltage at node VC2 continues to charge until either a limit is reached or until signal SET goes high. When signal SET goes high at time 354, node VC1 charges again and another cycle starts. When signal SET remains high starting at time 356, the maximum frequency of the dual relaxation oscillator is reached.

Figure 6:
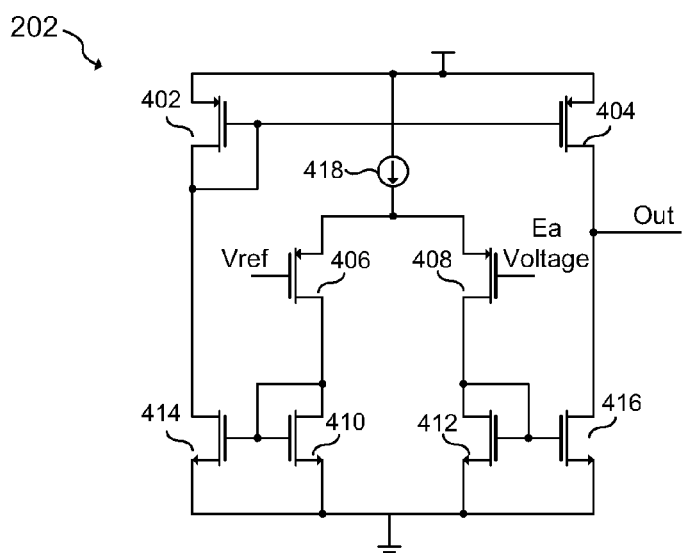
FIG. 6 illustrates an embodiment transconductance amplifier.

FIG. 6 illustrates an embodiment implementation of transconductance amplifier 202 (FIG. 4). Ea Voltage and Vref are compared by PMOS differential pair made from PMOS devices 406 and 408 and biased by current source 418. The output current of PMOS device 406 is mirrored to PMOS output transistor 404 via NMOS devices 410 and 414 and PMOS device 402. The output current of PMOS device is mirrored to NMOS output transistor 416 via NMOS device 412. It should be appreciated that the transconductance amplifier 202 depicted in FIG. 6 is one example implementation of a transconductance amplifier. Other transconductance amplifier structures known in the art can also be used.

Figure 7:
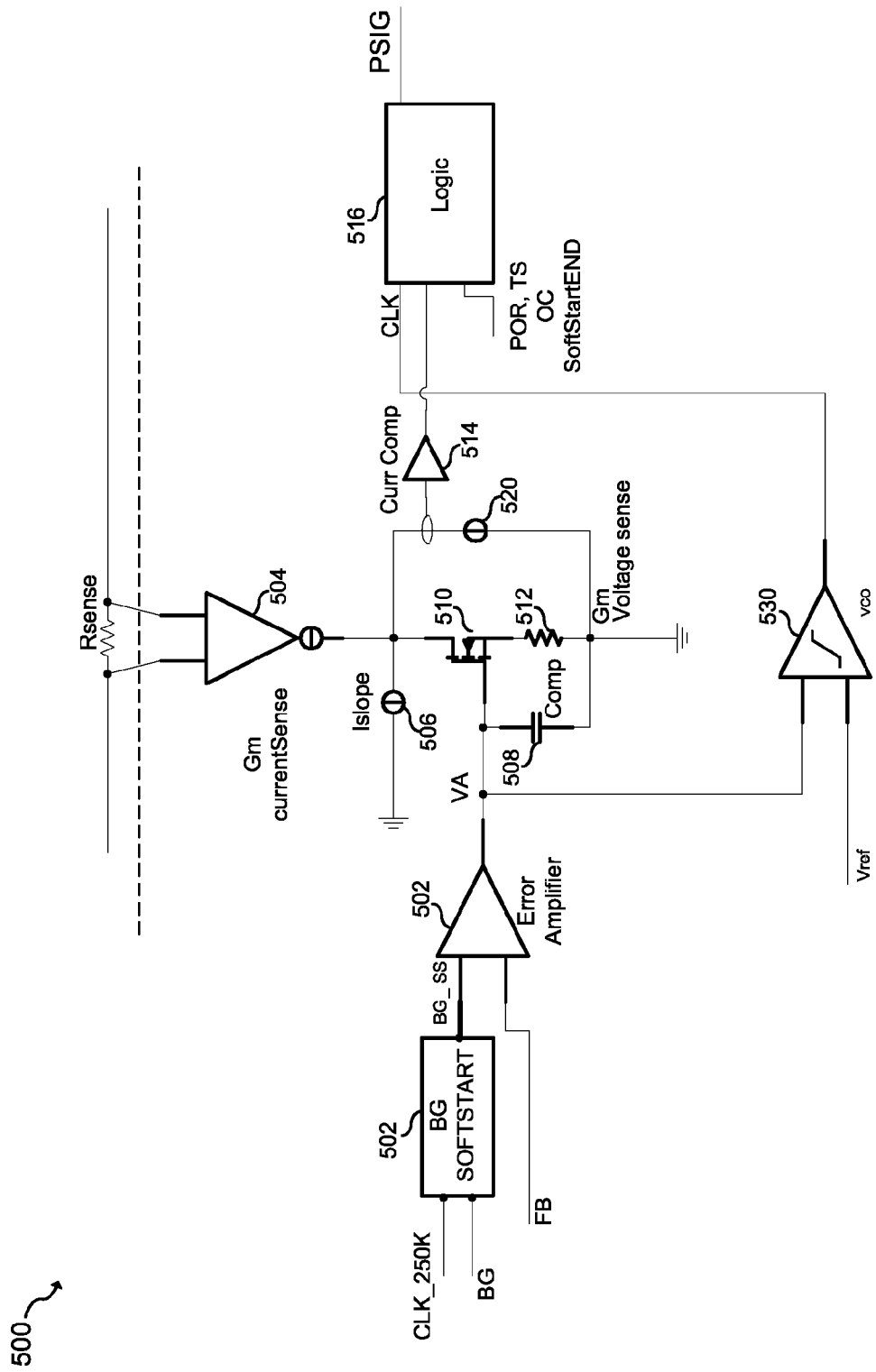
FIG. 7 illustrates a power supply controller according to an alternative embodiment.

FIG. 7 illustrates an embodiment implementation of switched mode power supply controller 500. Error amplifier 518 compares feedback voltage FB with a reference voltage at node BG_SS. Error amplifier output VA is converted to a current with a transconductance amplifier implemented with NMOS device 510 with source degeneration resistor 512. Compensation capacitor 508 is coupled to the output of error amplifier 518 and provides a dominant pole that stabilizes the power supply system. Voltage VA is also converted to a frequency using frequency limited VCO 530 to produce clock signal CLK. In an embodiment, the operating frequency of VCO 530 is proportional to the voltage EA up to a maximum operating frequency, as described above with respect to other embodiments.

Current comparator 514 compares the sum of the currents from the output of transistor 510, slope compensation current source 506, and transconductance amplifier 504 to a threshold. In one embodiment, this threshold is about 0 A. In one embodiment, current comparator 514 has a low input impedance schematically represented by voltage source 520. Transconductance amplifier 504 produces a current proportional to the voltage across resistor Rsense, which senses a current within the power supply system as described above with respect to FIGS. 1a and 1b.

In an embodiment, signal CLK sets a latch within logic block 516, and the output of current comparator 514 resets the latch within logic block 516 to produce pulse-modulated signal PSIG. Logic block also has inputs POR, TS, OC and SoftStartEND that control power-up, and reset conditions. POR is a power on reset signal, TS is a thermal shutdown signal that indicates an over temperature condition, OC indicates an over current condition and SoftStartEND is a signal that indicates the end of a soft start after the first turn on of the device after a shut down or an over temperature recovery sequence. In an embodiment, if the output voltage does not reach a target voltage value during the soft start sequence, then the system assumes that a system error, such as a hard short at the output, has occurred.

Voltage reference block 502 produces a voltage at node BG_SS. In an embodiment, BG_SS is a reference voltage that is proportional to a bandgap reference voltage BG during normal operation. In an embodiment, BG_SS is increased in a stepwise manner when recovering from an over temperature condition in order to prevent inrush current from battery during start-up and to avoid overshoot at the output. In some embodiments, BG_SS is also increased in a stepwise manner during power up. Clock signal CLK_250K provides a clock signal that clocks the stepwise increase in BG_SS. In an embodiment CLK_250K operates at about 250 KHz, however, in alternative embodiments, other frequencies can be used.

Figure 8:
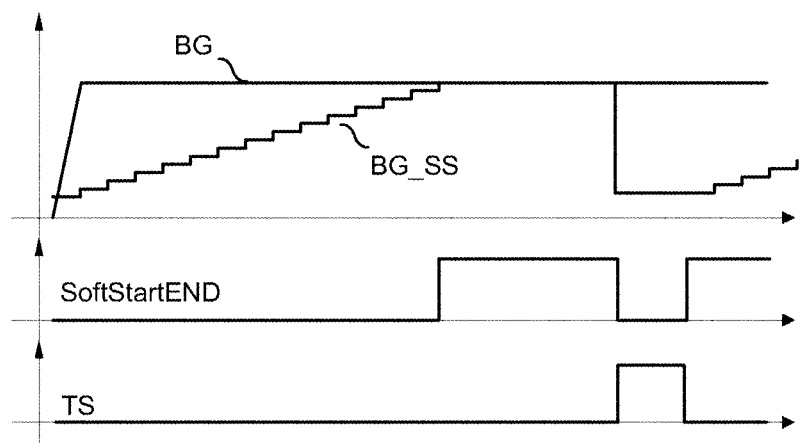
FIG. 8 illustrates a waveform diagram showing an embodiment power up sequence.

FIG. 8 illustrates a waveform diagram illustrating a soft start sequence. In an embodiment, voltage BG_SS increases stepwise and signal SoftStartEND is asserted when BG_SS approaches bandgap reference voltage BG. Furthermore, when an over temperature condition is detected, signal TS is asserted and node BG_SS is reset to a low voltage. Once signal TS is de-asserted, indicating an end of the over temperature condition, BG_SS increases back to BG.

Advantages of embodiments include a single power supply controller circuit that smoothly transitions between PFM and PWM operation. Such embodiments can have a lower hardware complexity, smaller layout, and lower power consumption compared to systems using separate PWM and PFM controllers and/or separate detection circuits that determine in which mode to operate. Furthermore, some embodiments that smoothly transition between PFM and PWM mode are advantageous because they avoid some issues of mode toggling. As discussed above, PWM control is more efficient than PFM control at high output currents and PFM control is more efficient at low output currents. Therefore, a further advantage of embodiments include the ability to operate efficiently over a wide range of output currents.

An advantage of embodiment systems includes the ability to scale current and voltage. Some advantageous embodiments automatically adapt to such scaling. In some embodiments, the threshold that determines a PFM mode to PWM transition or a PWM to PFM transition does not necessarily need to be re-optimized each time an external component value is modified to adjust the output current or output voltage of the power supply. Therefore, the task of designing a power supply system is simplified. A further advantage includes the ability to apply embodiment concepts to the design and implementation of a variety of power supply system types. For example, embodiments of the present invention can include, but are not limited to, step-up converters, step-down converters, converters using current-mode control, converters using voltage-mode control, and converters using both current mode and voltage mode control.

An advantage of some embodiment systems includes the ability to seamlessly transition between PWM and PFM modes. As such, some embodiments do not require dedicated mode selection that may mistakenly select the wrong operation mode. Furthermore, because some embodiments are not a superposition of two separate PWM and PFM controllers, but rather a unified block, a smaller circuit area is possible. A further advantage includes not having to park an error amplifier voltage when transitioning between a PWM and PFM mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a switched-mode power supply, the method comprising:
    producing an error signal based on a difference between an output voltage of the power supply and a reference voltage;
    producing a clock signal having a clock frequency based on the error signal, the clock frequency being proportional to the error signal up to maximum frequency;
    sensing a current in the switched-mode power supply to produce a sensed current signal;
    summing the error signal with the sensed current signal to produce a first signal;
    comparing the first signal with a first threshold, wherein
        summing the error signal comprises using a first transconductance amplifier to produce the error signal, the first transconductance amplifier having an input coupled to the error signal and an output of a second transconductance amplifier,
        sensing the current comprises using the second transconductance amplifier to produce the sensed current signal, the second transconductance amplifier having an output coupled to a current comparison output of the first transconductance amplifier, and
        comparing the first signal with the first threshold comprises using a current comparator comprising an input coupled to the current comparison output of the first transconductance amplifier;
    producing a first edge of a drive signal at a first edge of the clock signal; and
    producing a second edge of the drive signal when the first signal crosses the first threshold in a first direction based on the comparing, the second edge opposite the first edge.

2. The method of claim 1, further comprising:
    operating the switched-mode power supply in a pulse-width modulation (PWM) mode when the clock frequency is at about the maximum frequency; and
    operating the switched-mode power supply in a pulse-frequency modulation (PFM) mode when the clock frequency is less than the maximum frequency.

3. The method of claim 1, further comprising driving a switch of the switched-mode power supply with the drive signal.

4. The method of claim 1, wherein the first edge of the drive signal comprises a rising edge of the drive signal, and the second edge of the drive signal comprises a falling edge of the drive signal.

5. The method of claim 1, wherein producing the clock signal comprises producing the clock signal using a VCO having a limited output frequency characteristic.

6. The method of claim 1, wherein producing the clock signal comprises producing a ramp signal proportional to the error signal;
comparing the ramp signal with a threshold to activate an edge of a compare signal; and
when the edge of the compare signal is activated,
pulsing the clock signal in a first state for a first predetermined time duration to produce the first edge of the clock signal, and
resetting the ramp signal.

7. The method of claim 6, further comprising after pulsing the clock signal in a first state for a first predetermined time duration, keeping the clock signal in a second state for a second predetermined time duration, the second state opposite the first state.

8. The method of claim 7, wherein the first state comprises a logic high state, and the second state comprises a logic low state.

9. The method of claim 1, wherein sensing the current in the switched-mode power supply comprises sensing a current in series with a switch.

10. The method of claim 1, wherein producing the first edge of the drive signal and producing the second edge of the drive signal is performed using a same latch circuit when the clock frequency is at the maximum frequency and when the clock frequency is below the maximum frequency.

11. A switched-mode power supply controller comprising:
an error amplifier having an input configured to be coupled to an output voltage of a switched-mode power supply;
a controllable oscillator having a frequency control input coupled to an output of the error amplifier, the controllable oscillator producing a clock output, the clock output having an output frequency proportional to a first input range of the frequency control input up to a maximum frequency, wherein the controllable oscillator comprises
a ramp generator producing a ramp having a slope proportional to a signal at frequency control input, and resetting the ramp at an edge of clock output, wherein the ramp generator comprises a transconductance amplifier loaded with a capacitance, a reset switch configured to reset the capacitance, and a ramp comparator configured detect when a voltage across the capacitance crosses a threshold; and
a pulse generation circuit configured to assert the clock in a first state for a first predetermined clock duration when the ramp crosses a threshold, and then keep the clock in a second state for at least a second predetermined clock duration, wherein the pulse generation circuit comprises a latch having a set input coupled to the output of the ramp comparator, and a reset input coupled to the clock output, a first pulse circuit coupled between an output of the latch and the clock output, and a second pulse circuit coupled between the clock output and the reset input of the latch;
a current sensor configured to sense a current within the switched-mode power supply;
a first comparator comparing a sum of the output of the error amplifier and an output of a current sensor to a first threshold; and
a logic circuit configured to transition a drive signal from a first state to a second state at a first edge of the clock output of the controllable oscillator, and transition the drive signal from the second state to the first state at a first edge of an output of the first comparator.

12. The switched-mode power supply controller of claim 11, wherein:
the first edge of the clock output of the controllable oscillator comprises a rising edge; and
the first edge of the output of the first comparator comprises a rising edge; and
the drive signal is configured to activate a switch in the second state.

13. The switched-mode power supply controller of claim 11, wherein the logic circuit comprises a same latch that transitions the drive signal from the first state to the second state and from the second state to the first state when the output frequency is less than the maximum frequency and when the output frequency is at the maximum frequency.

14. A switched-mode power supply controller comprising:
an error amplifier having an input configured to be coupled to an output voltage of a switched-mode power supply;
a controllable oscillator having a frequency control input coupled to an output of the error amplifier, the controllable oscillator producing a clock output, the clock output having an output frequency proportional to a first input range of the frequency control input up to a maximum frequency;
a current sensor configured to sense a current within the switched-mode power supply;
a first comparator comparing a sum of the output of the error amplifier and an output of a current sensor to a first threshold;
a logic circuit configured to transition a drive signal from a first state to a second state at a first edge of the clock output of the controllable oscillator, and transition the drive signal from the second state to the first state at a first edge of an output of the first comparator; and
a first transconductance amplifier having an input coupled the output of the error amplifier and a current comparison output, wherein
the current sensor comprises a second transconductance amplifier having an output coupled to the current comparison output of the first transconductance amplifier, and
the first comparator comprises a current comparator comprising an input coupled to the current comparison output of the first transconductance amplifier.

15. The switched-mode power supply controller of claim 14, wherein the error amplifier comprises a third transconductance amplifier.

16. The switched-mode power supply controller of claim 15, wherein the controller operates in a pulse frequency modulation mode at low load currents and a pulse width modulation mode at high load currents.

17. The switched mode power supply controller of claim 15, wherein the switch controller is disposed on an integrated circuit.

18. A switched-mode power supply comprising:
a controller comprising
an error amplifier having an input coupled to an output node of the switched-mode power supply,
a first transconductance amplifier having an input coupled the output of the error amplifier and a current comparison output,
a controllable oscillator having a frequency control input coupled to an output of the error amplifier, the controllable oscillator producing a clock output, the clock output having an output frequency proportional to a first input range of the frequency control input up to a maximum frequency,
a current sensor sensing a current proportional to a load current of the switched-mode power supply, wherein the current sensor comprises a second transconductance amplifier having an output coupled to the current comparison output of the first transconductance amplifier,
a first comparator comparing a sum of the output of the error amplifier and an output of a current sensor to a first threshold, wherein the first comparator comprises a current comparator comprising an input coupled to the current comparison output of the first transconductance amplifier, and
a logic circuit configured to transition a logic circuit output signal from a first state to a second state at a first edge of the clock output of the controllable oscillator, and transition the logic circuit output signal from the second state to the first state at a first edge of an output of the first comparator;
a switch driver comprising an input coupled to the logic circuit output signal;
a switch comprising a control terminal coupled to an output of the switch driver;
the switched-mode power supply operates in a pulse frequency modulation mode when the controllable oscillator is operating within the first input range; and
the switched-mode power supply operates in a pulse width modulation mode when the controllable oscillator is operating beyond the first input range.

19. The switched-mode power supply of claim 18, further comprising:
an inductor coupled between an output terminal of the switch and a power supply output node;
a diode coupled to the output terminal of the switch; and
a current sense resistor coupled between a power supply input node and an input terminal of the switch, wherein the current sensor comprises a first input coupled to a first terminal of the current sense resistor and a second input coupled to a second terminal of the resistor, wherein the switched-mode power supply comprises a buck converter.

20. The switched-mode power supply of claim 18, wherein the logic circuit comprises a same latch that transitions the logic circuit output signal from the first state to the second state and from the second state to the first state when the clock output frequency is less than the maximum frequency and when the clock output frequency is at the maximum frequency.

* * * * *